United States Patent
Tayuki et al.

(10) Patent No.: US 11,498,341 B2
(45) Date of Patent: Nov. 15, 2022

(54) IMAGE PROCESSING METHOD, IMAGE PROCESSING DEVICE, AND PRINTING SYSTEM

(71) Applicant: SEIKO EPSON CORPORATION, Tokyo (JP)

(72) Inventors: Kazushige Tayuki, Nagano (JP); Yasushi Takeo, Nagano (JP)

(73) Assignee: Seiko Epson Corporation, Tokyo (JP)

(*) Notice: Subject to any disclaimer, the term of this patent is extended or adjusted under 35 U.S.C. 154(b) by 10 days.

(21) Appl. No.: 17/321,544

(22) Filed: May 17, 2021

(65) Prior Publication Data
US 2021/0354475 A1 Nov. 18, 2021

(30) Foreign Application Priority Data
May 18, 2020 (JP) .............................. JP2020-086512

(51) Int. Cl.
*H04N 1/60* (2006.01)
*B41J 2/21* (2006.01)

(52) U.S. Cl.
CPC ........... *B41J 2/2114* (2013.01); *B41J 2/2132* (2013.01); *H04N 1/605* (2013.01); *H04N 1/6075* (2013.01)

(58) Field of Classification Search
CPC .... H04N 1/605; H04N 1/6075; H04N 1/6027; H04N 1/6058; H04N 1/603
See application file for complete search history.

(56) References Cited

U.S. PATENT DOCUMENTS 11,283,967 B1* 3/2022 Granger .................... G06T 5/50
2009/0185230 A1* 7/2009 Mestha .............. G06K 15/1822
358/3.23

FOREIGN PATENT DOCUMENTS

JP 2009-278227 A 11/2009
JP 2017-001288 A 1/2017

* cited by examiner

*Primary Examiner* — Julian D Huffman
(74) *Attorney, Agent, or Firm* — Global IP Counselors, LLP

(57) ABSTRACT

Provided is an image processing method for generating print data, the method including an ink amount generating step for generating CMYK data based on image data. The ink amount generating step determines the CMYK data based on a brightness L* calculated using a function f3(D) satisfying f1(D)≥f3(D) in a range of the gradation values D from a coordinates Pk to a coordinates Ps and also satisfying f1(D)≥f3(D) in at least part of the range.

9 Claims, 8 Drawing Sheets

IMAGE PROCESSING METHOD, IMAGE PROCESSING DEVICE, AND PRINTING SYSTEM

The present application is based on, and claims priority from Application Serial Number 2020-086512, filed May, 18, 2020, the disclosure of which is hereby incorporated by reference herein in its entirety.

BACKGROUND

1. Technical Field

The present disclosure relates to an image processing method for causing a printing device to perform printing on the basis of image data, an image processing device, and a printing system provided with the image processing device and the printing device that performs the printing on the basis of print data generated by the image processing device.

2. Related Art

As a technique for obtaining a more vibrant color image, JP-A-9-163164 discloses an image processing method that converts image data into data of a color space capable of handling luminance and saturation information, extracts data necessary to perform saturation correction, from the saturation information of a predetermined luminance range that is set while taking into account distribution characteristics of the saturation for each luminance, and performs saturation correction processing on the basis of the extracted data.

However, in the image processing method described in JP-A-9-163164, in particular in the field of inkjet color image printing, depending on a hue, it is difficult to obtain sufficient saturation, and even when the saturation correction processing is performed, an expected vibrant color image may not be obtained.

SUMMARY

An image processing method according to the present disclosure is an image processing method for generating print data for causing a printing device to perform printing based on image data. The method includes an image data acquiring step for acquiring the image data, an ink amount data generating step for generating ink amount data, based on the acquired image data, and a print data generating step for generating the print data, based on the generated ink amount data. The ink amount generating step includes determining the ink amount data based on a brightness L calculated using a function f3(D) satisfying f1(D)≥f3(D) in a range of gradation values D from coordinates Pk to coordinates Ps and also satisfying f1(D)>f3(D) in at least part of the range, and/or a function f4(D) satisfying f2(D)≤f4(D) in a range of the gradation values D from the coordinates Ps to coordinates Pw and also satisfying f2(D)<f4(D) in at least part of the range, when, in a color gamut of a color space of the image data, a gradation value of the image data from a black point to a white point via a specific point of a predetermined hue is the gradation value D, in a color gamut of a color space reproduced by the printing device, a brightness corresponding to the gradation value D is the brightness L, a two-dimensional space formed by the gradation value D and the brightness L is a space (D,L), coordinates, in the space (D,L), corresponding to the black point are the coordinates Pk, coordinates, in the space (D,L), corresponding to the specific point are the coordinates Ps, coordinates, in the space (D,L), corresponding to the white point are the coordinates Pw, a straight line, in the space (D,L), including the coordinates Pk and the coordinates Ps is L=f1(D), and a straight line, in the space (D,L), including the coordinates Ps and the coordinates Pw is L=f2(D).

An image processing device according to the present disclosure is an image processing device for generating print data for causing a printing device to perform printing based on image data. The image processing device includes a data acquisition unit configured to acquire the image data, and an image processing unit configured to generate ink amount data, based on the acquired image data, and to generate the print data, based on the generated ink amount data. The image processing unit determines the ink amount data based on a brightness L calculated using a function f3(D) satisfying f1(D)≥f3(D) in a range of gradation values D from coordinates Pk to coordinates Ps and also satisfying f1(D)>f3(D) in at least part of the range, and/or a function f4(D) satisfying f2(D)≤f4(D) in a range of the gradation values D from the coordinates Ps to coordinates Pw, and also satisfying f2(D)<f4(D) in at least part of the range, when, in a color gamut of a color space of the image data, a gradation value of the image data from a black point to a white point via a specific point of a predetermined hue is the gradation value D, in a color gamut of a color space reproduced by the printing device, a brightness corresponding to the gradation value D is the brightness L, a two-dimensional space formed by the gradation value D and the brightness L is a space (D,L), coordinates, in the space (D,L), corresponding to the black point are the coordinates Pk, coordinates, in the space (D,L), corresponding to the specific point are the coordinates Ps, coordinates, in the space (D,L), corresponding to the white point are the coordinates Pw, a straight line, in the space (D,L), including the coordinates Pk and the coordinates Ps is L=f1(D), and a straight line, in the space (D,L), including the coordinates Ps and the coordinates Pw is L=f2(D).

In addition, a printing system according to the present disclosure is a printing system including the image processing device described above, and a printing device configured to perform printing based on print data generated by the image processing device.

DESCRIPTION OF EXEMPLARY EMBODIMENTS

Figure 1:
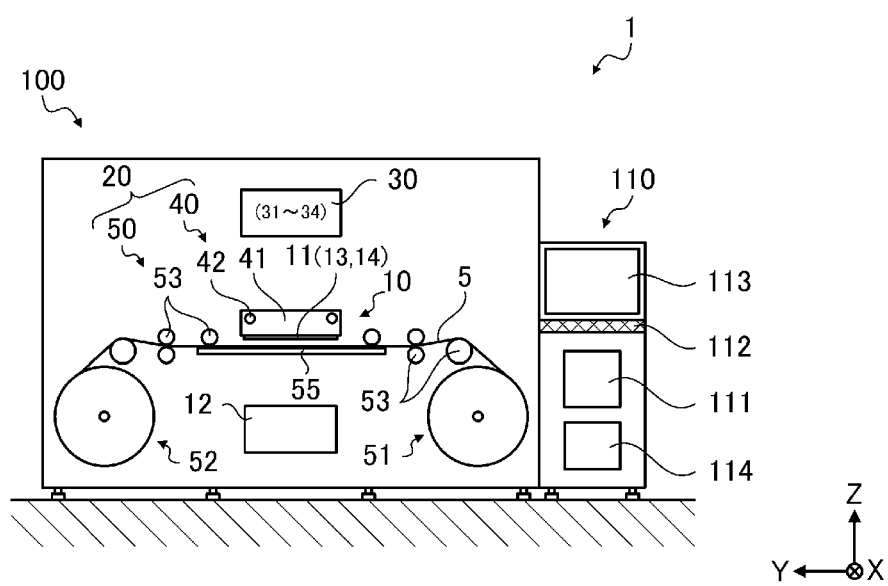
FIG. 1 is a front view illustrating a configuration of a printing system according to an embodiment.
Figure 2:
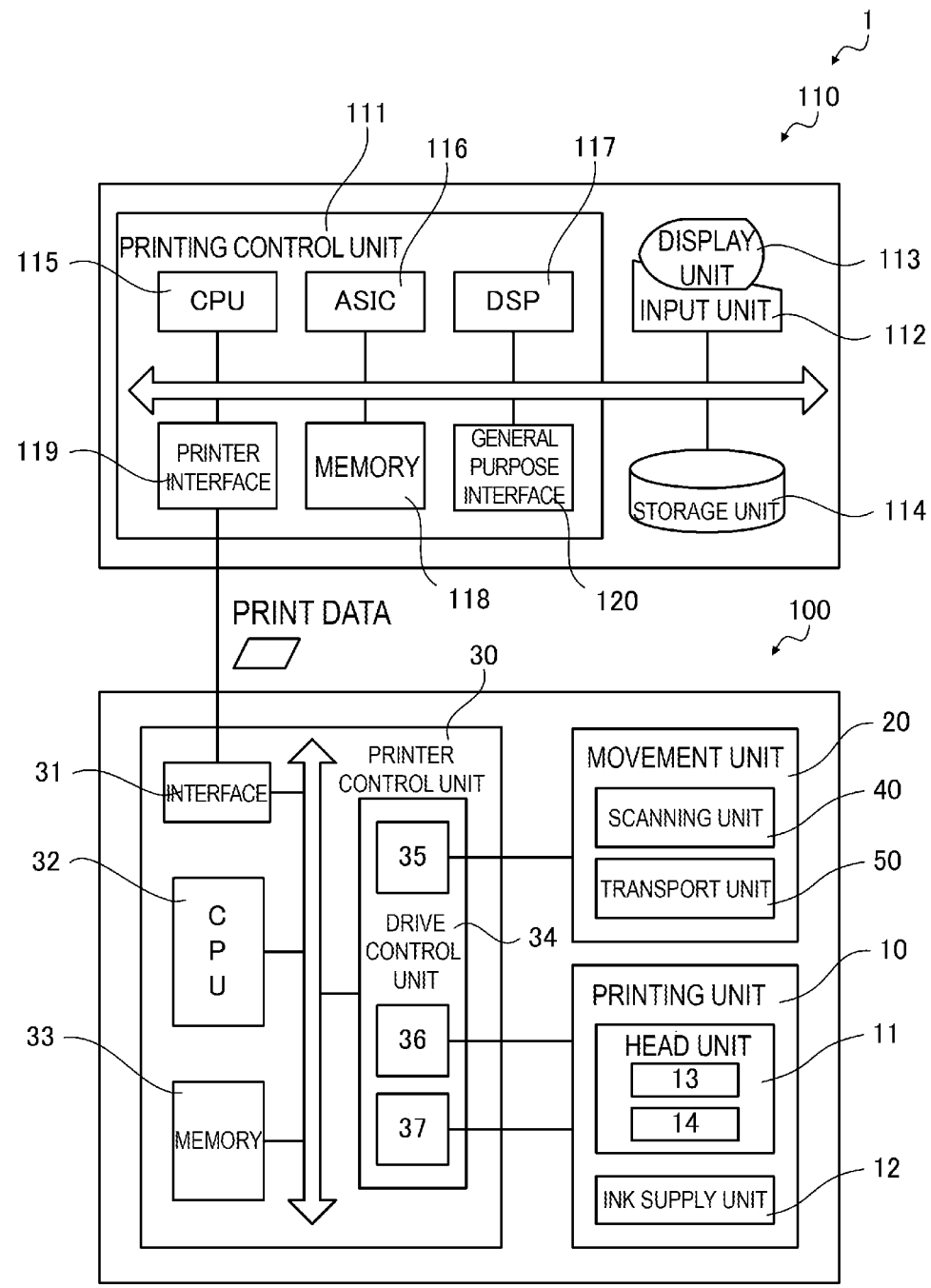
FIG. 2 is a block diagram illustrating the configuration of the printing system according to the embodiment.

First, a configuration of a printing system 1 according to an embodiment will be described with reference to FIG. 1.

Note that, in coordinates noted in the drawings, a Z-axis direction is an up-down direction, a positive Z direction is an upward direction, an X-axis direction is a front-rear direction, a negative X direction is a frontward direction, a Y-axis direction is a left-right direction, a positive Y direction is a leftward direction, and an X-Y plane is a horizontal plane.

The printing system 1 is configured by a printer 100 as a printing device, and a personal computer 110 as an image processing device connected to the printer 100. The personal computer 110 is hereinafter referred to as the PC 110.

The printer 100 is an inkjet printer that prints a desired image on a long printing medium 5 set in a state of being wound in a roll shape, based on print data received from the PC 110.

The PC 110 includes a printing control unit 111, an input unit 112, a display unit 113, a storage unit 114, and the like, and controls printing jobs that cause the printer 100 to perform printing. Further, the PC 110 generates the print data used to cause the printer 100 to print the desired image based on image data.

Software operated by the PC 110 includes general image processing application software that deals with the image data to be printed, printer driver software that generates the print data for controlling printer 100 and causing the printer 100 to perform the printing, and a color conversion look-up table creation program that creates a color conversion look-up table necessary for generating the print data. In the following description, the image processing application software will simply be referred to as an image processing application, and the printer driver software will simply be referred to as a printer driver. Further, the color conversion look-up table creation program will be referred to as a LUT creation program.

Here, the image data is RGB digital image information that also includes text data, full-color image data, or the like.

The printing control unit 111 includes a CPU 115, an ASIC 116, a DSP 117, a memory 118, a printer interface 119, a general purpose interface 120, and the like, and performs centralized management of the entire printing system 1. CPU is an abbreviation for central processing unit, ASIC is an abbreviation for application specific integrated circuit, and DSP is an abbreviation for digital signal processor.

The input unit 112 is an information input device serving as a user interface. Specifically, the input unit 112 is, for example, a keyboard, a mouse pointer, and the like.

The display unit 113 is an information display device serving as a user interface, and displays information input from the input unit 112, the image to be printed by the printer 100, information relating to the print job, and the like, under the control of the printing control unit 111.

The storage unit 114 is a rewritable storage medium such as a hard disk drive or a memory card, and stores the programs operated by the printing control unit 111 as the software operated by the PC 110, along with the image to be printed, the information relating to the print job, and the like.

The memory 118 is a storage medium that secures a region for storing programs operated by the CPU 115, a work region for operating the programs, and the like, and is configured by storage elements such as a RAM and an EEPROM. RAM is an abbreviation for random access memory and EEPROM is an abbreviation for electrically erasable programmable read-only memory.

The general purpose interface 120 is an interface capable of connecting external electronic devices, such as a LAN interface and a USB interface. LAN is an abbreviation of local area network, and USB is an abbreviation of universal serial bus. In the embodiment, the general-purpose interface 120 is a data acquisition unit that acquires image data from an external electronic device under the control of the CPU 115.

The printer 100 includes a printing unit 10, a movement unit 20, and a printer control unit 30. The printer 100 that has received the print data from the PC 110 uses the printing control unit 30 to control the printing unit 10 and the movement unit 20 based on the print data, in order to print the image on the printing medium 5.

The print data is image formation data obtained by converting the image data so that the printer 100 can print the image data using the application and printer driver included in the PC 110, and includes a command for controlling the printer 100.

The printing unit 10 is configured by a head unit 11, an ink supply unit 12, and the like.

The movement unit 20 is configured by a scanning unit 40, a transport unit 50, and the like.

The scanning unit 40 is configured by a carriage 41, a guide shaft 42, a carriage motor, and the like. The carriage motor is omitted from the drawings.

The transport unit 50 is configured by a supply unit 51, a housing unit 52, transport rollers 53, a platen 55, and the like.

The head unit 11 is provided with a printing head 13 that includes a plurality of nozzle rows in which a plurality of nozzles for discharging printing ink, as ink droplets, are arrayed, and a head control unit 14. The head unit 11 is mounted on the carriage 41, and reciprocates in the X-axis direction along with the carriage 41 that moves in the X-axis direction, which is a scanning direction.

The ink supply unit 12 is provided with an ink tank, and an ink supply path that supplies the ink from the ink tank to the printing head 13. The ink tank and the ink supply path are omitted from the drawings.

An ink set of four colors obtained by adding black to an ink set of three colors of cyan, magenta, and yellow is used as the ink.

The ink tank, the ink supply path, and an ink supply path to the nozzle that discharges the same ink are provided separately for each of the inks.

The movement unit 20, that is, the scanning unit 40 and the transport unit 50, causes the printing medium 5 to move relatively with respect to the printing head 13 under the control of the printer control unit 30.

The guide shaft 42 extends in the X-axis direction, and supports the carriage 41 in a slidable contact state. Further, the carriage motor serves as a drive source when causing the carriage 41 to reciprocate along the guide shaft 42. In other words, under the control of the printer control unit 30, the scanning unit 40 moves the carriage 41, that is, the printing head 13, in the X-axis direction along the guide shaft 42. As a result of the printing head 13 provided on the head unit 11 mounted on the carriage 41 discharging the ink droplets onto the printing medium 5 supported on the platen 55 while moving in the X-axis direction, under the control of the printer control unit 30, a plurality of dot rows are formed on the printing medium 5 along the X-axis direction.

The supply unit 51 rotatably supports a reel on which the printing medium 5 is wound into the roll, and the supply unit 51 feeds the printing medium 5 onto a transport path. The housing unit 52 rotatably supports a reel onto which the printing medium 5 is wound, and takes up the printing medium 5 on which printing is completed, from the transport path.

The transport roller 53 is formed by a driving roller that causes the printing medium 5 to move along an upper surface of the platen 55 in the Y-axis direction that is the transport direction, and a driven roller that rotates in accordance with the movement of the printing medium 5, and configures the transport path for transporting the printing medium 5 from the supply unit 51 to the housing unit 52 via a printing region of the printing unit 10. The printing region is a region, on the upper surface of the platen 55, in which the printing head 13 moves in the X-axis direction.

The printer control unit 30 includes an interface unit 31, a CPU 32, a memory 33, and a drive control unit 34, and controls the printer 100.

The interface 31 is connected to the printer interface 119 of the PC 110, and performs transmission and reception of data between the PC 110 and the printer 100.

The CPU 32 is an arithmetic processing device for performing overall control of the printer 100.

The memory 33 is a storage medium that secures a region for storing programs operated by the CPU 32, a work region for operating the programs, and the like, and is configured by storage elements such as a RAM and an EEPROM.

The CPU 32 controls the printing unit 10 and the movement unit 20 via the drive control unit 34, in accordance with the programs stored in the memory 33 and the print data received from the CP 110.

The drive control unit 34 includes firmware that operates based on the control of the CPU 32, and controls driving of the head unit 11 and the ink supply unit 12 of the printing unit 10, and of the scanning unit 40 and the transport unit 50 of the movement unit 20. The drive control unit 34 is configured by drive control circuits including a moving control signal generating circuit 35, a discharge control signal generating circuit 36, a drive signal generating circuit 37, and the like, and by a ROM, a flash memory, or the like that incorporates firmware that controls the drive control circuits. The ROM, the flash memory, or the like incorporating the firmware that controls the drive control circuits are omitted from the drawings. Here, ROM is an abbreviation of read-only memory.

The moving control signal generating circuit 35 is a circuit that generates a signal for controlling the scanning unit 40 and the transport unit 50 of the movement unit 20, based on the print data and in accordance with a command from the CPU 32.

The discharge control signal generating circuit 36 is a circuit that generates a head control signal for selecting the nozzle to discharge the ink, selecting an amount to be discharged, controlling a discharge timing, and the like, based on the print data and in accordance with a command from the CPU 32.

The drive signal generating circuit 37 is a circuit that generates a drive signal to drive a pressure generating chamber provided in the printing head 13.

According to the configuration described above, the printer control unit 30 prints the desired image on the printing medium 5 by repeating, with respect to the printing medium 5 supplied to the printing region by the transport roller 53, an operation of discharging the ink droplets from the printing head 13 while moving the carriage 41 supporting the printing head 13 in the X-axis direction along the guide shaft 42, and an operation of moving the printing medium 5 in the positive Y direction intersecting the X-axis direction, using the transport roller 53.

Printing on the printing medium 5 is started by the print data being transmitted to the printer 100 from the PC 110. The print data is generated by the printer driver.

Figure 3:
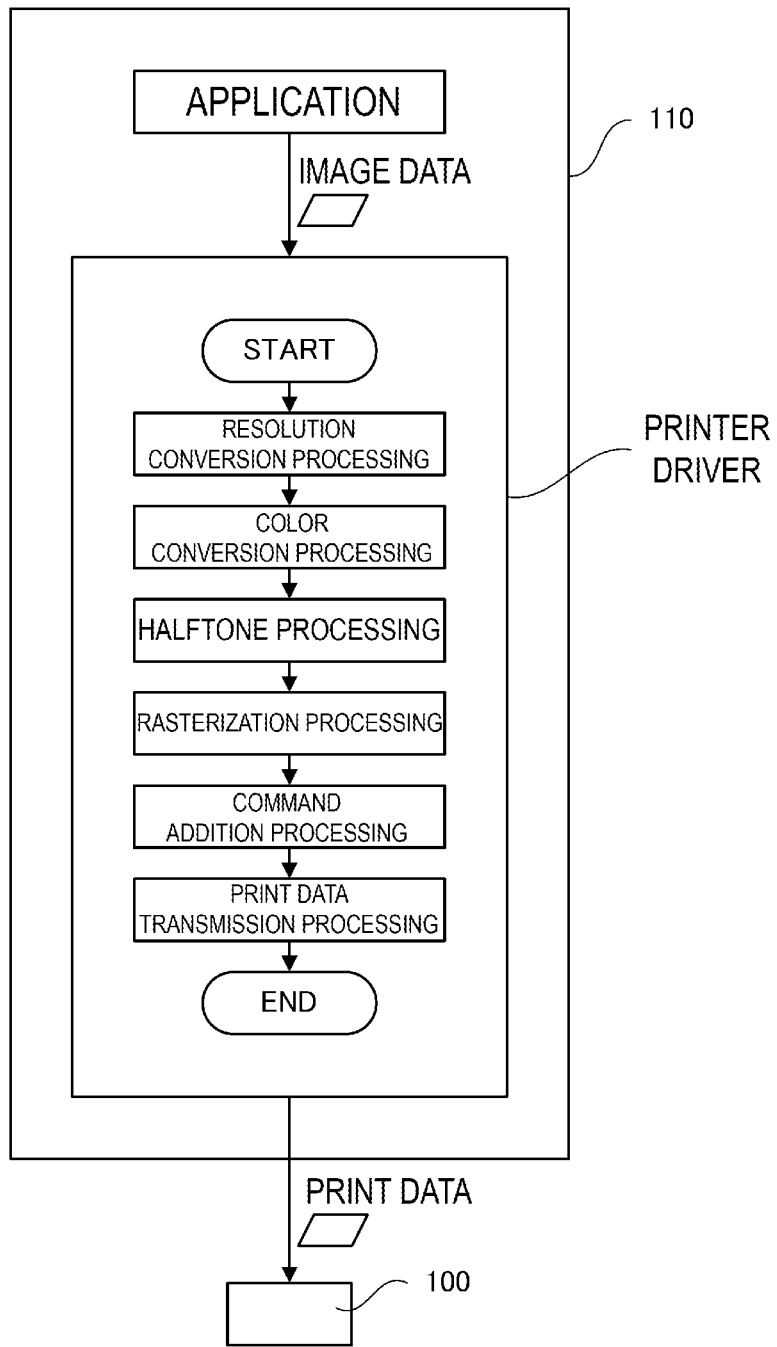
FIG. 3 is an explanatory diagram of basic functions of a printer driver.

Hereinafter, print data generation processing performed by the print driver will be described with reference to FIG. 3.

The printer driver receives the image data from the image processing application, converts the image data into the print data of a format that can be interpreted by the printer 100, and outputs the print data to the printer 100. When converting the image data from the image processing application to the print data, the printer driver performs resolution conversion processing, color conversion processing, halftone processing, rasterization processing, command addition processing, and the like.

Note that, in the print data generation processing by the printer driver, a step for receiving the image data from the image processing application is an image data acquiring step in the embodiment.

The resolution conversion processing is processing for converting the image data output from the image processing application into a resolution for the printing on the printing medium 5. For example, when a resolution for printing is specified to be 720×720 dpi, the vector format image data received from the image processing application is converted into bitmap format image data having the 720×720 dpi resolution. Each of pixel data of the image data after the resolution conversion processing is configured by pixels arranged in a matrix pattern. Each of the pixels has a gradation value in 256gradations in the RGB color space, for example. In other words, each of the pixel data after the resolution conversion indicates the gradation value of the corresponding pixel. Hereinafter, the gradation value data in the RGB color space is referred to as RGB data.

Among the pixels arranged in the matrix pattern, the pixel data corresponding to one row of pixels aligned in a predetermined direction is referred to as raster data. Note that the predetermined direction in which the pixels corresponding to the raster data are aligned corresponds to a movement direction of the printing head 13 when printing the image, namely, to the X-axis direction. The movement direction of the print head 13 is, in other words, a relative movement direction in which the print head 13 and the printing medium 5 move relative to each other.

The color conversion processing is processing for converting the RGB data into gradation data of a CMYK color space. The CMYK colors are cyan, magenta, yellow, and black, and the image data of the CMYK color space is data corresponding to colors of the ink provided in the printer 100. Therefore, for example, when the printer 100 uses four types of ink of the CMYK color system, the printer driver generates the image data in a four-dimensional space of the CMYK color system, based on the RGB data. The gradation value data of the CMYK color space is, in other words, ink amount data. Hereinafter, the gradation value data of the CMYK color space is referred to as CMYK data.

This color conversion processing is performed based on a color conversion look-up table LUT in which the gradation values of the RGB data and the gradation values of the CMYK color system data are associated with each other. Note that pixel data after the color conversion processing is the CMYK data of 256gradations represented by the CMYK color space, for example. In the embodiment, a step of performing the color conversion processing is an ink amount data generating step for generating ink amount data based on the acquired image data.

Halftone processing is processing for converting data of a large number of gradations, such as data of 256gradations, into data of a number of gradations that can be formed by the printer 100. Through this halftone processing, data representing 256gradations is converted, for example, into 1-bit halftone data expressing two gradations of dot and no dot, or 2-bit halftone data expressing four gradations of no dot, small dot, medium dot, and large dot. Specifically, a dot generation ratio corresponding to the gradation value is determined from a dot generation ratio table in which the gradation values of 0 to 255 and the dot generation ratio are associated with each other. As for the dot generation ratio determined in correspondence with the gradation value, for example, when there are four gradations, the dot generation ratio for each of the no dot, the small dot, the medium dot, and the large dot is determined. In the respective dot generation ratios that are acquired, pixel data is created such that the dots are formed in a dispersed manner using a dithering method, an error diffusion method, or the like.

The rasterization processing is processing for rearranging the above-described 1-bit or 2-bit pixel data arranged in the matrix pattern, in accordance with a dot formation order at the time of printing. The rasterization processing includes pass allocation processing for allocating the image data configured by the pixel data after the halftone processing to each of passes in which the printing head 13 discharges the ink droplets while moving. Once the pass allocation is complete, the actual nozzles are allocated that form the respective raster lines configuring a print image.

The command addition processing is processing for adding, to the rasterized data, command data corresponding to a printing method. The command data is, for example, transport data related to a transport specification of the printing medium 5. The transport specification is, for example, a movement amount and a movement speed of the printing medium 5 in the transport direction on the upper surface of the platen 55.

A series of processing by the printer driver is performed by the ASIC 116 and the DSP 117 under the control of the CPU 115. Then, in print data transmission processing, the print data generated by the series of processing is transmitted to the printer 100 via the printer interface 119.

In the embodiment, a series of steps after the halftone processing to generate the print data based on the CMYK data is a print data generating step.

Further, in the embodiment, the printing control unit 111 configured to perform the series of processing after the halftone processing to generate the print data based on the CMYK data and to determine the ink amount data is an image processing unit.

Next, with reference to FIG. 4 and FIG. 5, an example of a basic flow of color conversion look-up table creation processing performed by the LUT creation program will be described.

Figure 4:
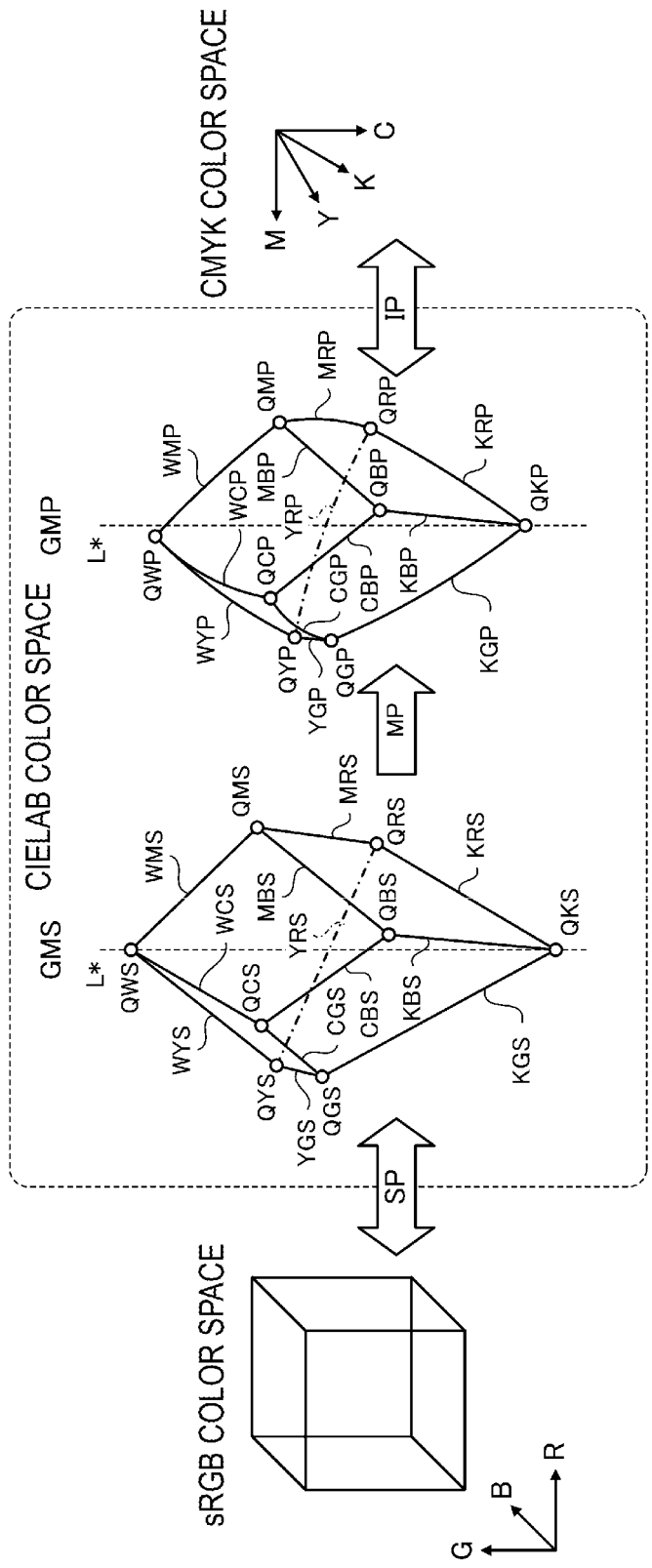
FIG. 4 is a conceptual diagram illustrating a relationship between each of color spaces in color conversion.
Figure 5:
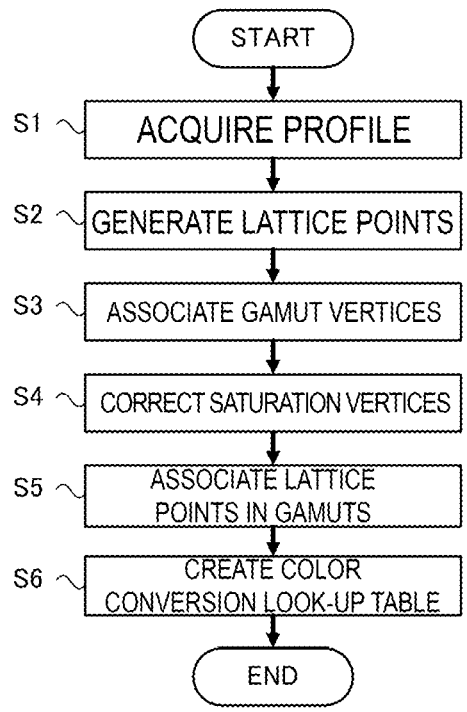
FIG. 5 is a flowchart illustrating an example of a basic flow of LUT creation processing executed by an LUT creation program.

Here, as illustrated in FIG. 4, as an example of the processing for converting the RGB data of the image data to the CMYK data for the printing, an example is described in which sRGB data, which is a typical RGB standard, is converted, via the CIELAB color space as a profile connection space, to the CMYK color space, which is a space of the ink amount data. The CIELAB color space is CIE1976 (L*a*b*) color space. CIE is an acronym for Commission Internationale de l'Eclairage, which is the International Commission on Illumination.

The color conversion look-up table is a look-up table in which gradation values of the sRGB data and gradation values of the CMYK data are associated with each other, and is generated using a source profile SP, a mapping table MP, and an ink amount profile IP.

The source profile is a look-up table created in advance using attributes of the image data, and the source profile SP is a look-up table defining a correspondence relationship between coordinate values in the sRGB color space and L*a*b* values, which are coordinate values in the CIELAB color space. The source profile SP associates the color gamut that can be reproduced by the sRGB color space with a source gamut GMS represented by the L*a*b* values. In the embodiment, the source gamut GMS is a color space color gamut of the image data.

Note that in the embodiment, the coordinates of the sRGB color space are expressed by the gradation values of integers from 0 to 255. The source profile SP may be provided in the form of a transform, as long as it is possible to define the correspondence relationship between the coordinates of the sRGB color space and the L*a*b* values in the CIELAB color space.

The ink amount profile is a look-up table created in advance in accordance with a specification of the printing device, and the ink amount profile IP is a look-up table defining a correspondence relationship between coordinate values in the CMYK color space of the printer 100 and the L*a*b* values in the CIELAB color space. The CMYK color space is a color space that can be reproduced by the inks used by the printer 100, and the coordinates in the CMYK color space represent combinations of ink amounts of CMYK. The coordinates of the CMYK color space are expressed by the gradation values of integers from 0 to 255. By specifying the coordinates of the CMYK color space to the printer 100, the printer 100 reproduces, on the recording medium, an ink coverage ratio corresponding to ratios of ink amounts in accordance with the coordinates. In fact, as described above, with respect to the coordinate data in the CMYK color space, the print data is generated by the processing from the halftone processing onward, and the printer 100 is driven by the print data. As a result of the printer 100 reproducing the ink coverage ratio on the recording medium based on the coordinates of the CMYK color space, the colors of the L*a*b* values corresponding to the coordinates of the CMYK color space are reproduced.

The color gamut that can be reproduced by the printer 100 is limited by the specifications of the printer 100 and of the ink used by the printer 100, and is associated, using the ink amount profile IP, with the printer gamut GMP represented by the L*a*b* values. In the embodiment, the printer gamut GMP is the color space color gamut that is reproduced by the printing device.

In the example of the printer 100 of the embodiment, as illustrated in FIG. 4, the sizes of the source gamut GMS and of the printer gamut GMP differ from each other in the CIELAB color space, and the printer gamut GMP is smaller than the source gamut GMS. In other words, the color gamut that the printer 100 can reproduce becomes a color gamut that is narrower than the color gamut of the image data. Therefore, the coordinates of each of lattice points of the source gamut GMS are mapped to correspond to the coordinates of each of lattice points of the printer gamut GMP. The table associating the coordinates of each of the lattice points is the mapping table MP.

Before describing the color conversion look-up table creation processing including a method for creating the mapping table MP, the source gamut GMS and the printer gamut GMP will be described.

The source gamut GMS and the printer gamut GMP together configure a color gamut surrounded by six surfaces. A line connecting each of the surfaces configures a ridge, and a point at which the ridges intersect configures a vertex.

The 8 vertices in the source gamut GMS have L*a*b* values obtained as a result of the 8 vertices of the sRGB color space being converted by the source profile SP. The 8 vertices of the sRGB color space are a K vertex (R,G,B)=(0,0,0), an R vertex (255,0,0), a G vertex (0,255,0), a B vertex (0,0,255), a Y vertex (255,255,0), an M vertex (255,0,255), a C vertex (0,255,255), and a W vertex (255, 255,255).

The ridges in the source gamut GMS correspond to trajectories of L*a*b* values obtained as a result of each of the ridges in the sRGB color space being converted by the source profile SP.

Hereinafter, the 8 vertices of the source gamut GMS are source vertices QWS, QRS, QGS, QBS, QCS, QMS, QYS, and QKS, and, of these, the source vertices QRS, QGS, QBS, QCS, QMS, and QYS are source saturation vertices. Further, the source vertex QWS corresponds to a vertex of highest brightness, and the source vertex QKS corresponds to a vertex of lowest brightness. In other words, in the embodiment, the source vertex QWS is a white point, and the source vertex QKS is a black point.

The ridges in the source gamut GMS corresponding to trajectories of the L*a*b* values obtained as a result of converting, using the source profile SP, the ridges corresponding to (R,G,B)=(255,255,x), (255,x,255), and (x,255, 255) in the sRGB color space are, respectively, source ridges WYS, WMS, and WCS. Note that x represents an integer from 0 to 255. Further, the ridges in the source gamut GMS corresponding to trajectories of the L*a*b* values obtained as a result of converting, using the source profile SP, the ridges corresponding to (R,G,B)=(0,0,x), (0,x,0), and (x,0,0) in the sRGB color space are, respectively, source ridges KRS, KGS, and KBS. Furthermore, the ridges of the source gamut GMS that do not include the source vertices QWS and QKS are, respectively, source ridges MRS, MBS, YRS, YGS, CBS, and CGS.

The printer gamut GMP also has 8 vertices. The vertices are printer vertices QWP, QRP, QGP, QBP, QCP, QMP, QYP, and QKP, respectively, and of these, the printer vertices QRP, QGP, QBP, QCP, QMP, and QYP are also referred to as printer saturation vertices. The printer vertices QWP, QRP, QGP, QBP, QCP, QMP, QYP, and QKP correspond to the L*a*b* values of the colors reproduced, respectively, when the printer 100 performs the printing using ink amounts of (C,M,Y,K)=(0,0,0,0), (0,255,255,0), (255,0,255, 0), (0,255,255,0), (255,0,0,0), (0,255,0,0), (0,0,255,0), and (255,255,255,0). Note that the printer vertex QKP illustrates an example in which the ink amount of the CMY inks is replaced with the ink amount of the K ink, taking into account a limitation of an ink ejection amount of the printer 100.

The printer gamut GMP includes printer ridges WCP, WMP, WYP respectively connecting the printer vertices QCP, QMP, and QYP with the printer vertex QWP.

The printer ridges WCP, WMP, and WYP respectively correspond to trajectories of the L*a*b* values obtained when the printing is performed using an ink amount that changes asymptotically from (C,M,Y,K)=(0,0,0,0) to (255, 0,0,0) for WCP, an ink amount that changes asymptotically from (C,M,Y,K)=(0,0,0,0) to (0,255,0,0) for WMP, and an ink amount that changes asymptotically from (C,M,Y,K)=(0,0,0,0) to (0,0,255,0) for WYP. In other words, when the colors reproduced by only monochromatic inks are plotted in the CIELAB color space, the printer ridges WYP, WMP, and WCP are formed. The CMY inks are able to reproduce a highly saturated color in their corresponding hues, and the colors reproduced using the monochromatic inks configure the outermost ridges in the printer gamut GMP.

The printer gamut GMP includes printer ridges KRP, KGP, and KBP that respectively connect the printer vertices QRP, QGP, and QBP, with the printer vertex QKP.

The printer ridges KRP, KGP, and KBP respectively correspond to trajectories of the L*a*b* values obtained when the printing is performed using an ink amount that changes asymptotically from (C,M,Y,K)=(255,0,255,0) to (0,0,0,255) for KRP, an ink amount that changes asymptotically from (C,M,Y,K)=(0,255,255,0) to (0,0,0, 255) for KGP, and an ink amount that changes asymptotically from (C,M,Y,K)=(0,0,0,255) to (0,0,255,0) for KBP. At this time, with respect to the ink amount of K, the CMY inks are replaced with the K ink as appropriate, and a known method, such as the UCR method, is used as the method, for example. OCR is an abbreviation for under color removal.

Furthermore, the ridges of the printer gamut GMP that do not include the printer vertices QWP and QKP are, respectively, printer ridges MRP, MBP, YRP, YGP, CBP, and CGP.

Next, creation processing for creating the mapping table MP performed by the LUT creation program will be described, following a flowchart illustrated in FIG. 5. The embodiment has specific features in the method of creating the mapping table MP, but first, an example will be explained of a basic method for creating the mapping table MP.

First, at step S1, the source profile SP and the ink amount profile IP are acquired.

Next, at step S2, based on the source profile SP, coordinate information for all the lattice points configuring the source gamut GMS in the CIELAB color space is generated. Further, based on the ink amount profile IP, coordinate information for all the lattice points configuring the printer gamut GMP is generated.

Next, at step S3, coordinates of the 8 vertices of each of the gamuts are associated with each other.

Specifically, the coordinates of the source vertex QKS are associated with the coordinates of the printer vertex QKP, the coordinates of the source vertex QWS are associated with the coordinates of the printer vertex QWP, and further, the coordinates of the six source saturation vertices are associated with the coordinates of the six printer saturation vertices of the corresponding hues.

Next, at step S4, as necessary, correction is performed on the coordinates of the associated six printer saturation vertices. Since the hue of the printer saturation vertex is dependent on a type of color material of each of the inks, the printing medium, and the like, hue angles between the source saturation vertices and the printer saturation vertices, and relative relationships between the respective hue angles may not match. Further, a maximum saturation point in the printer gamut GMP does not necessarily match the printer vertex, and there may be a difference between the maximum saturation point and the printer vertex. Here, at step S4, as necessary, that is, in response to the state of difference between the coordinates of the hue of the saturation point and the maximum saturation point, the coordinates of the associated six printer saturation points are respectively corrected to the coordinates of the maximum saturation point of the hue angle closest to the hue angle of the corresponding source saturation vertex.

Next, at step S5, the coordinates of the lattice points other than the 8 vertices of the source gamut GMS are associated with the coordinates of the lattice points of the printer gamut GMP. Specifically, based on data of each of the 8 vertices of the source gamut GMS and the respectively associated coordinates of the 8 vertices of the printer gamut GMP, the coordinates of each of the lattice points of the source gamut GMS are associated with the coordinates of the lattice points of the printer gamut GMP so as to retain a ratio of distances between each of the lattice points in the source gamut GMS, that is, to retain a color difference ratio.

As a result of performing step S2 to step S5, the mapping table MP is completed that causes the coordinates of each of the lattice points of the source gamut GMS to be associated with the coordinates of each of the lattice points of the printer gamut GMP.

Next, at step S6, a color conversion look-up table is created using the source profile SP, the ink amount profile IP, and the completed mapping table MP. Specifically, a look-up table is created that associates the gradation values of the sRGB data with the gradation values of the CMYK data derived from the input gradation values of the sRGB data via the source profile SP, the mapping table MP, and the ink amount profile IP, and the look-up table is stored in the storage unit 114 as the color conversion look-up table.

In relation to the above-described basic creation processing for the color conversion look-up table, in the color conversion look-up table creation processing according to the embodiment, by imparting specific features to the mapping in which the coordinates of each of the lattice points of the source gamut GMS are associated with the coordinates of each of the lattice points of the printer gamut GMP, in a predetermined hue, a more vibrant color image can be obtained. Based on a method for the color conversion look-up table creation processing to be described below, a method for the print data generating processing that is the series of processing performed by the printer driver is a method of processing to determine the ink amount data with which the printing device is caused to perform the printing, based on the image data, and generate the print data, and is an image processing method of the present application.

Details will be described below.

Figure 6:
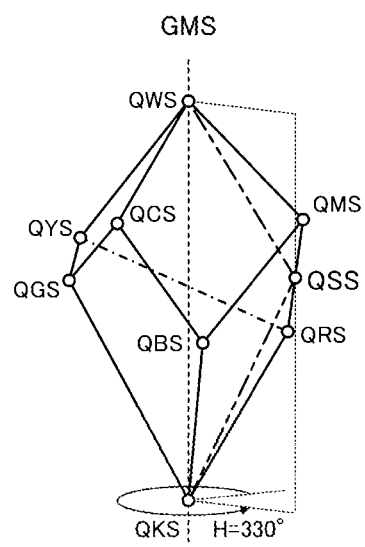
FIG. 6 is a conceptual diagram illustrating a path of a source gamut GMS from a source vertex QKS to a source vertex QWS via a singular point QSS of a predetermined hue.

First, as illustrated in FIG. 6, in the source gamut GMS, attention will be paid to a surface path of the source gamut GMS from the source vertex QKS, which is a black point, to the source vertex QWS, which is a white point, via a specific point QSS of a predetermined hue. Here, the specific point QSS of the predetermined hue is, for example, the maximum saturation point of the hue in the center between the hue of the source vertex QMS and the hue of the source vertex QRS, that is, a cusp of the hue.

Figure 7:
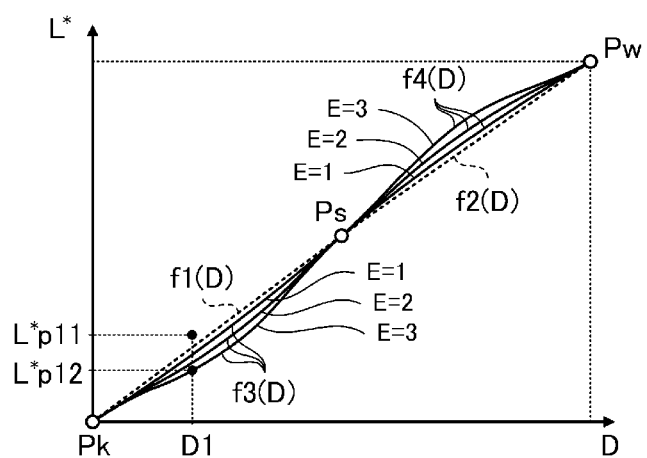
FIG. 7 is a graph showing a gradation value D of image data corresponding to the path of the source gamut GMS from the source vertex QKS to the source vertex QSS via the singular point QSS of the predetermined hue, and a two-dimensional space (D,L*) formed by the gradation value D and a brightness L* when a brightness corresponding to the gradation value D in a printer gamut GMP is the brightness L*.

When the gradation value of image data corresponding to this path is a gradation value D, and a brightness corresponding to the gradation value D is a brightness L*, FIG. 7 illustrates a two-dimensional space (D,L*) formed by the gradation values D and the brightnesses L*. Note that, here, the brightness L* indicates the brightness L* in the corresponding printer gamut GMP via the mapping table MP.

In FIG. 7, coordinates in the space (D,L*) corresponding to the source vertex QKS are coordinates Pk, coordinates in the space (D,L*) corresponding to the specific point QSS are coordinates Ps, and coordinates in the space (D,L*) corresponding to the source vertex QWS are coordinates Pw. Further, a straight line including the coordinates Pk and the coordinates Ps in the space (D,L*) is defined as L*=f1(D), and a straight line including the coordinates Ps and the coordinates Pw in the space (D,L*) is defined as L*=f2(D).

In such a relationship, in the ink amount data generating step, the CMYK data is determined based on the brightness L* calculated using a function f3(D) that satisfies f1(D)≥f3(D) in a range of the gradation values D from the coordinates Pk to the coordinates Ps and satisfies f1(D)>f3(D) in at least part of the range, and/or a function f4(D) that satisfies f2(D)≤f4(D) in a range of the gradation values D from the coordinates Ps to the coordinates Pw and satisfies f2(D)<f4(D) in at least part of the range.

Note that f1(D), f2(D), f3(D), and f4(D) are functions in which the discrete brightnesses L* are associated with the discrete gradation values D. In other words, the functions f1(D), f2(D), f3(D), and f4(D) may be look-up tables in which the brightness L* is associated with the gradation value D.

Figure 8:
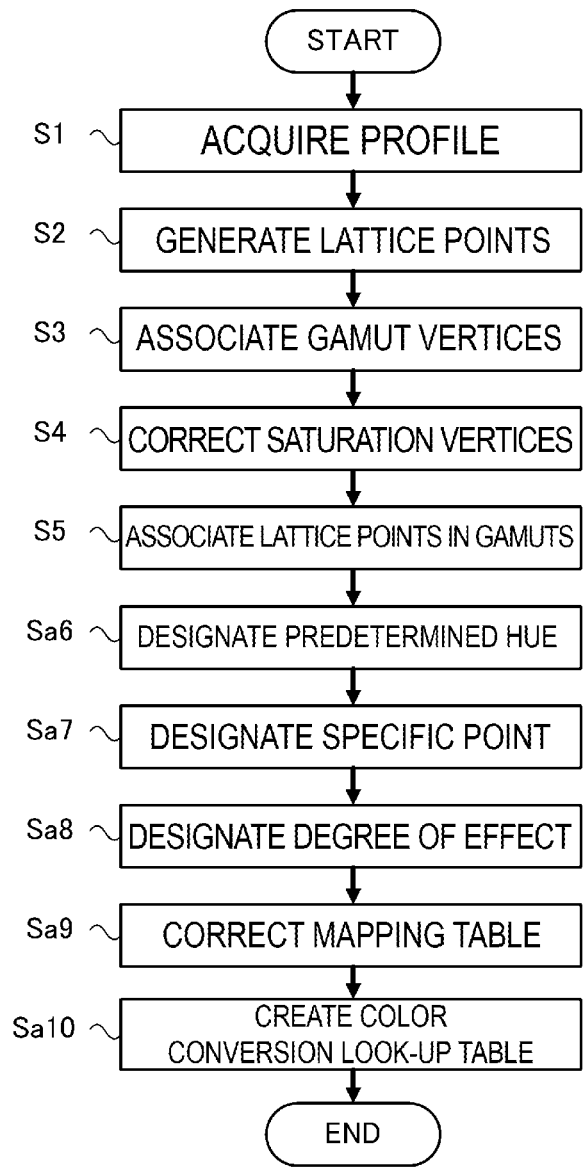
FIG. 8 is a flowchart of the LUT creation processing executed by the LUT creation program in an image processing method according to the embodiment.

An example of the LUT creation processing executed by the LUT creation program according to the embodiment will be described in further detail with reference to a flowchart illustrated in FIG. 8.

First, the mapping table MP is created in accordance with the basic processing at step S1 to step S5 described above.

Next, at step Sa6, a hue that is a target for improving printing vibrancy, namely, the predetermined hue, is designated. Specifically, for example, a hue angle H in an HSV color space is designated as the predetermined hue. Rather than designating the one hue angle H, a range of hues may be designated as the predetermined hue, such as designating a range of the hue angles H in the HSV color space. For example, in the example illustrated in FIG. 6, the hue angle H is 330°, but the predetermined hue may be designated as a range, such as the hue angles H of 330° to 360°.

The designation of the predetermined hue can be performed using the input unit 112, under the control of the LUT creation program.

Note that the designated predetermined hue is preferably designated from the viewpoint of a degree of effect. The degree of effect is the degree of improvement in the printing vibrancy achieved as a result of determining the CMYK data based on the brightness L* calculated using the function f3(D) and/or the function f4(D). In the embodiment, a vibrancy in printing appearance is improved by obtaining a brightness contrast effect based on the brightness L* calculated using the function f3(D) and/or the function f4(D). In other words, the degree of effect is the degree to which the brightness contrast effect is obtained.

From the viewpoint of the degree to which the brightness contrast effect is obtained, the predetermined hue is preferably a hue included in a hue region, in the HSV color space, corresponding to the hue angles H from 330° to 30° or to the hue angles H from 90° to 150°.

Alternatively, from the viewpoint of the degree to which the brightness contrast effect is obtained, when a brightness range from the white point to the black point of the source gamut GMS is 100, and the brightness of the cusp in the predetermined hue is a brightness $Lc^*$, the predetermined hue is preferably a hue that satisfies $40<Lc^*<95$. Alternatively, when a brightness range from the white point to the black point of the printer gamut GMP is 100, the predetermined hue is preferably a hue that satisfies $45<Lc^*<80$.

Next, at step Sa7, the specific points QSS is designated. In the example illustrated in FIG. 6, the specific point QSS is the cusp in the predetermined hue, but the specific point QSS is not limited thereto. Depending on the image to be printed, and further, depending on an expected effect, for example, the specific point QSS may be the maximum saturation point in an average brightness of the predetermined hue in the image data. Further, depending on the image to be printed, for example, the specific point QSS may be the maximum saturation point in a median brightness of the predetermined hue in the image data.

The designation of the specific point QSS can be performed, for example, by performing selection using the input unit 112, from a menu screen displayed on the display unit 113 under the control of the LUT creation program.

Next, at step Sa8, the degree of effect, that is, the degree of improvement in the vibrancy in printing appearance in the predetermined hue, is designated. The degree of effect is determined by the function f3(D) and the function f4(D). Therefore, the function f3(D) and the function f4(D) are sufficiently evaluated in advance and prepared as a plurality of the functions f3(D) and a plurality of the functions f4(D) corresponding to the appropriate degree of effect, based on the evaluation results. Further, for example, as illustrated in FIG. 7, a numerical value of an effect level, such as E=1 to 3 or the like, is associated with each of the plurality of functions f3(D) and the plurality of functions f4(D) corresponding to that level, and, by selecting that numerical value, the corresponding function can be set.

The degree of effect can be designated, for example, by performing selection using the input unit 112, from the menu screen displayed on the display unit 113 under the control of the LUT creation program.

Next, at step Sa9, the mapping table MP is corrected based on the designated hue, the designated specific point, and the designated degree of effect.

For example, a case will be specifically described in which the predetermined hue is the hue with the hue angle H of 330°, the specific point QSS in the predetermined hue is the cusp, as illustrated in FIG. 6, and further, the degree of effect is set to E=3 in the function f3(D).

Note that, although the function f3(D) exemplified in FIG. 7 is illustrated as the function satisfying f1(D)>f3(D) over the whole range of the gradation values D from the coordinates Pk to the coordinates Ps, the function f3(D) is not limited thereto. The function f3(D) may be a function that satisfies f1(D)≥f3(D) in the range of the gradation values D from the coordinates Pk to the coordinates Ps, and that satisfies f1(D)>f3(D) in at least in some sections of the range.

The LUT creation program corrects the brightness $L^*$ values at the coordinate values of the lattice points of the printer gamut GMP corresponding to the gradation values D of the image data from the coordinates Pk to the coordinates Ps in the hue for which the hue angle H is 330°, to the brightness $L^*$ values calculated using the function $L^*=f3(D)$ corresponding to E=3. For example, as illustrated in FIG. 7, in the space (D,$L^*$), a coordinate value (D1,$L^*$p11) corresponding to a gradation value D1 of the image data is corrected to a coordinate value (D1,$L^*$p12) on $L^*=f3(D)$, and the brightness $L^*$ value of the lattice point of the printer gamut GMP corresponding to the gradation value D1 of the image data in the hue for which the hue angle H is 330° is corrected from $L^*$p11 to $L^*$p12.

Next, the LUT creation program corrects the mapping table MP so that the coordinates of the lattice points of the printer gamut GMP to be associated with the coordinate values of the lattice points of the source gamut GMS corresponding to the gradation values D of the image data from the coordinates Pk to the coordinates Ps are associated with the coordinate values of the lattice points of the corrected printer gamut GMP.

For example, when a coordinate value ($L^*$p11,$a^*$p,$b^*$p) of the lattice point of the printer gamut GMP is associated with a coordinate value ($L^*$s11,$a^*$s,$b^*$s) of the lattice point of the source gamut GMS using the mapping table MP before the correction, a coordinate value ($L^*$p12, $a^*$p,$b^*$p) of the lattice point of the printer gamut GMP is associated with the coordinate value ($L^*$s11,$a^*$s,$b^*$s) of the lattice point of the source gamut GMS using the mapping table MP after the correction.

Note that the correction of the mapping table MP need not only target the lattice point whose brightness is corrected by the designated function, but the brightness $L^*$ values at coordinate values of the lattice points in the vicinity of the lattice point of the corrected printer gamut GMP may also be targeted, and the correction may be performed depending on a distance from the corrected lattice point, that is, may be performed such that a correction value becomes smaller the greater a distance from the corrected lattice point in the vicinity thereof.

Figure 9:
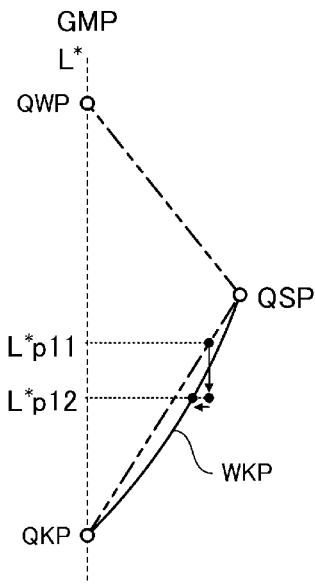
FIG. 9 is a conceptual diagram illustrating a method for preventing correction exceeding a color gamut of the printer gamut.

As illustrated in FIG. 9, a case is assumed in which the coordinate value of the lattice point of the corrected printer gamut GMP exceeds the color gamut of the printer gamut GMP and an outer wall WKP illustrated in FIG. 9. In this case, the saturation coordinates are further moved in an axial direction of the brightness $L^*$, and are corrected so as to fall within the color gamut of the printer gamut GMP.

Note that coordinates QSP illustrated in FIG. 9 are coordinates of the printer gamut GMP corresponding to the specific point QSS.

Note that, at step Sa8, when the function f4(D) is not specifically designated, the correction relating to the coordinate values of the lattice points of the printer gamut GMP corresponding to the gradation values D in the range from the coordinates Ps to the coordinates Pw is not performed. In other words, the correction of the mapping table MP corresponding to the coordinates of the lattice points in this range is not performed.

Further, at step Sa8, for example, when the degree of effect is set to E=3 with respect to the function f4(D), the brightness $L^*$ values at the coordinate values of the lattice points of the printer gamut GMP corresponding to the gradation values D of the image data from the coordinates Ps to the coordinates Pw are corrected to the brightness $L^*$ values calculated using the function $L^*=f4(D)$ corresponding to E=3, and the mapping table MP is corrected. Note that, although the function f4(D) exemplified in FIG. 7 is illustrated as the function satisfying f2(D)<f4(D) over the whole range of the gradation values D from the coordinate Ps to the coordinate Pw, the function f4(D) is not limited thereto. The function f4(D) may be a function that satisfies f2(D)≤f4(D) in the range of the gradation values D from the coordinates Ps to the coordinates Pw, and that satisfies f2(D)<f4(D) in at least part of the range.

The setting of the degree of effect at step Sa8 can be performed independently for either of or both of the functions f3(D) and f4(D), including a case in which they are not designated.

Next, at step Sa10, a color conversion look-up table is created using the source profile SP, the ink amount profile IP, and the corrected mapping table MP, and is stored in the storage unit 114 as the color conversion look-up table.

According to the embodiment, the following effects can be obtained.

According to the image processing method according to the embodiment, in the space (D,L*), which is the two-dimensional space including the gradation values D and the brightnesses L*, in the range of the gradation values D from the coordinates Pk corresponding to the black point to the coordinates Ps corresponding to the specific point QSS of the predetermined hue, with respect to the straight line L*=f1(D) including the coordinates Pk and the coordinates Ps, the CMYK data is determined based on the brightnesses L* calculated using the function f3(D) that satisfies f1(D)≥f3(D), and that satisfies f1(D)>f3(D) in at least part of the range. In other words, the brightness L* values corresponding to the gradation values D in the range from the coordinates Pk to the coordinates Ps do not become higher than the brightnesses L* corresponding to the straight line including the coordinates Pk and the coordinates Ps, and in at least part of the range, the CMYK data is determined so as to have low brightness. As a result, a difference in brightness is relatively increased with respect to the brightnesses L* corresponding to the gradation values D in the range from the coordinates Ps corresponding to the specific point QSS of the predetermined hue to the coordinates Pw corresponding to the white point, and, by achieving a brightness contrast effect, even when the maximum saturation in the printing does not change, the more vibrant image can be obtained in terms of appearance.

Further, in the space (D,L*), which is the two-dimensional space including the gradation values D and the brightnesses L*, in the range of the gradation values D from the coordinates Ps corresponding to the specific point QSS of the predetermined hue to the coordinates Pw corresponding to the white point, with respect to the straight line L*=f2(D) including the coordinates Ps and the coordinates Pw, the CMYK data is determined based on the brightnesses L* calculated using the function f4(D) that satisfies f2(D)≥f4(D), and that satisfies f2(D)<f4(D) in at least part of the range. That is, the brightnesses L* corresponding to the gradation values D in the range from the coordinates Ps to the coordinates Pw do not become less than the brightnesses L* corresponding to the straight line including the coordinates Ps and the coordinates Pw, and in at least some sections, the CMYK data is determined so as to have high brightness. As a result, the difference in brightness is relatively increased with respect to the brightnesses L* corresponding to the gradation values D in the range from the coordinates Pk corresponding to the black point to the coordinates Ps corresponding to the specific point QSS of the predetermined hue, and, by achieving the brightness contrast effect, even when the maximum saturation in the printing does not change, the more vibrant image can be obtained in terms of appearance.

Further, when the specific point QSS is the cusp indicating the highest saturation in the predetermined hue, the brightnesses L* corresponding to the gradation values D in the range from the coordinates Pk corresponding to the black point to the coordinates Ps corresponding to the maximum saturation do not become higher than the brightnesses L* corresponding to the straight line including the coordinates Pk and the coordinates Ps, and, at least in some sections of the range, the CMYK data is determined so as to have low brightness. As a result, the difference in brightness is relatively increased with respect to the brightnesses L* corresponding to the gradation values D in the range from the coordinates Ps corresponding to the cusp of the predetermined hue to the coordinates Pw corresponding to the white point, and, by achieving the brightness contrast effect, even when the maximum saturation in the printing does not change, the more vibrant image can be obtained in terms of appearance.

Further, the brightnesses L* corresponding to the gradation values D in the range from the coordinates Ps corresponding to the maximum saturation to the coordinates Pw do not become lower than the brightnesses L* corresponding to the straight line including the coordinates Ps and the coordinates Pw, and at least in some sections of the range, the CMYK data is determined so as to have high brightness. As a result, the difference in brightness is relatively increased with respect to the brightnesses L* corresponding to the gradation values D in the range from the coordinates Pk corresponding to the black point to the coordinates Ps corresponding to the cusp of the predetermined hue, and, by achieving the brightness contrast effect, even when the maximum saturation in the printing does not change, the more vibrant image can be obtained in terms of appearance.

Further, when the specific point QSS is the maximum saturation point in an average brightness of the predetermined hue in the image data, even when the average brightness of the image differs, the difference in brightness of the image on either side of the average brightness can be increased, and thus, the brightness contrast effect can be obtained, and the more vibrant image can be obtained in terms of appearance.

Further, when the specific point QSS is the maximum saturation point in a median brightness of the predetermined hue in the image data, even when the median brightness of the image differs, the difference in brightness of the image on either side of the average brightness can be increased, and thus, the brightness contrast effect can be obtained, and the more vibrant image can be obtained in terms of appearance.

Also, when the brightness is normalized to a brightness range from the white point to the black point of the source gamut GMS when the brightness range from the white point to the black point of the source gamut GMS is 100, and the predetermined hue is a hue for which the brightness of the cusp is the brightness Lc* that satisfies 40<Lc*<95, the brightness contrast effect can be more effectively obtained, and the more vibrant image can be obtained in terms of appearance.

Further, when the brightness is normalized to a brightness range from the white point to the black point of the printer gamut GMP to the black point when the brightness range from the white point to the black point of the printer gamut GMP is 100, and the predetermined hue is a hue for which the brightness of the cusp is the brightness Lc* that satisfies 45<Lc*<80, the brightness contrast effect can be more effectively obtained, and the more vibrant image can be obtained in terms of appearance.

Further, when the predetermined hue is a hue included in the hue region, in the HSV color space, corresponding to the hue angles H from 330° to 30° or the hue angles H from 90° to 150°, the brightness contrast effect can be more effectively obtained, and the more vibrant image can be obtained in terms of appearance.

Further, according to the PC 110 that is the image processing device according to the embodiment, the ink amount data is determined using the above-described image processing method. Therefore, even when the maximum saturation of the color reproduced by the printer 100 does not change, the more vibrant image can be obtained in terms of appearance.

Further, according to the printing system 1 according to the embodiment, since the printing system 1 includes the above-described PC 110 and printer 100 that performs the printing based on the print data generated by the PC 110, even when the maximum saturation of the color reproduced by the printer 100 does not change, the more vibrant image can be obtained in terms of appearance.

Note that in the above-described embodiment, the image processing method is described in which the color conversion look-up table obtained by correcting the mapping table MP is used to obtain the print data that can perform the more vibrant printing by increasing the brightness contrast effect. However, the image processing method is not limited to this method.

As long as it is the image processing method that determines the ink amount data based on the brightness L calculated using the above-described function f3(D) and/or the function f4(D), the method may be a method, for example, that directly creates the mapping table MP while associating the coordinate values of the lattice points of the target source gamut GMS with the coordinate values of the lattice points of the printer gamut GMP, based on the designated predetermined hue, the specific point QSS of the predetermined hue, and the degree of effect, rather than correcting the mapping table MP that is created in advance.

Further, in the method of creating the color conversion look-up table using the correction, a target of the correction is not limited to the mapping table MP. Since the color conversion look-up table is a table in which the gradation values of the input RGB data are associated with the gradation values of the CMYK data, as long as the same results, that is, as long as the table having the same correspondence relationship as the color conversion look-up table can be obtained, the target of the correction may be any one of the RGB data, the source profile SP, the coordinate values of the lattice points in the source gamut GMS associated using the source profile SP, the mapping table MP, the coordinate values of the lattice points in the printer gamut GMP mapped using the mapping table MP, the ink amount profile IP, and the gradation values of the CMYK data derived using the ink amount profile IP.

Further, in the above-described embodiment, the method is described that determines the CMYK data based on the brightness L* calculated using the function f3(D) and the function f4(D) defined by a magnitude relationship between the straight line L*=f1(D) and the straight line L*=f2(D). However, in the printer gamut GMP, the brightness contrast effect may be obtained by correcting the brightness L* values either side of the brightness L* of the designated specific point in the designated hue.

Figure 10:
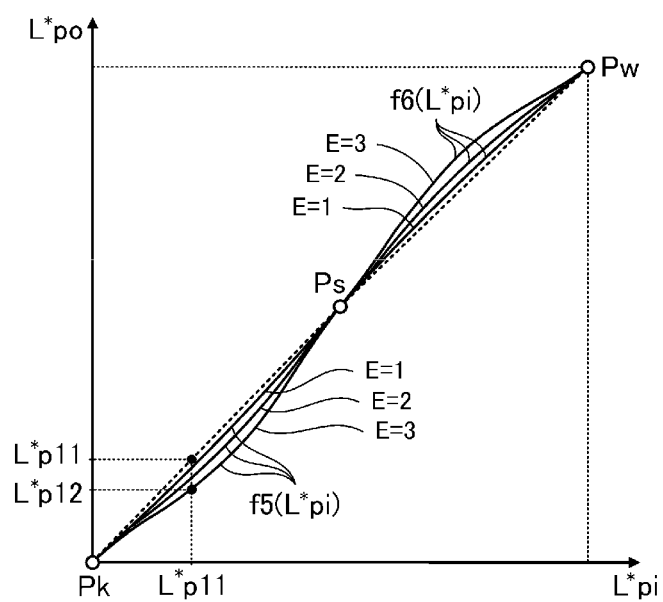
FIG. 10 is a graph showing the correspondence of brightnesses in the printer gamut before and after correction, in another method for correcting the brightness.

Specifically, as illustrated in FIG. 10, when the brightness of the coordinates to be corrected before the correction is a brightness L*pi, and the brightness after the correction is L*po, in the ink amount data generating step, the CMYK data is determined based on the brightness L*po calculated using a function f5(L*pi) that satisfies L*pi≥L*po in the brightness L*pi of the range from the coordinates Pk to the coordinates Ps, and that satisfies L*pi>L*po in at least part of the range, and/or a function f6(L*pi) that satisfies L*pi≤L*po in the brightness L*pi of the range from the coordinates Ps to the coordinates Pw, and that satisfies L*pi<L*po in at least part of the range.

What is claimed is:

1. An image processing method for generating print data for causing a printing device to perform printing based on image data, the method comprising:
   an image data acquiring step for acquiring the image data;
   an ink amount data generating step for generating ink amount data, based on the acquired image data; and
   a print data generating step for generating the print data, based on the generated ink amount data, wherein the ink amount generating step includes determining the ink amount data based on a brightness L calculated using a function f3(D) satisfying f1(D)≥f3(D) in a range of gradation values D from coordinates Pk to coordinates Ps and also satisfying f1(D)>f3(D) in at least part of the range, and/or a function f4(D) satisfying f2(D)≤f4(D) in a range of the gradation values D from the coordinates Ps to coordinates Pw and also satisfying f2(D)<f4(D) in at least part of the range,
   when, in a color gamut of a color space of the image data, a gradation value of the image data from a black point to a white point via a specific point of a predetermined hue is the gradation value D,
   in a color gamut of a color space reproduced by the printing device, a brightness corresponding to the gradation value D is the brightness L,
   a two-dimensional space formed by the gradation value D and the brightness L is a space (D,L),
   coordinates, in the space (D,L), corresponding to the black point are the coordinates Pk,
   coordinates, in the space (D,L), corresponding to the specific point are the coordinates Ps,
   coordinates, in the space (D,L), corresponding to the white point are the coordinates Pw,
   a straight line, in the space (D,L), including the coordinates Pk and the coordinates Ps is L=f1(D), and
   a straight line, in the space (D,L), including the coordinates Ps and the coordinates Pw is L=f2(D).

2. The image processing method according to claim 1, wherein
   the specific point is a cusp in the color gamut of the color space of the image data.

3. The image processing method according to claim 2, wherein
   the predetermined hue is a hue satisfying 40<Lc<95, when a brightness range from the white point to the black point of the color gamut of the color space of the image data is 100, and the brightness of the cusp is a brightness Lc.

4. The image processing method according to claim 2, wherein
   the predetermined hue is a hue satisfying 45<Lc<80, when a brightness range from a white point to a black point of the color gamut of the color space reproduced by the printing device is 100, and the brightness of the cusp is a brightness Lc.

5. The image processing method according to claim 1, wherein
   the specific point is a maximum saturation point at an average brightness of the predetermined hue in the image data.

6. The image processing method according to claim 1, wherein
   the specific point is a maximum saturation point at a median brightness of the predetermined hue in the image data.

7. The image processing method according to claim 1, wherein
the predetermined hue is a hue included in a hue region having a hue angle H from 330° to 30° and the hue angle H from 90° to 150° in an HSV color space.

8. An image processing device for generating print data for causing a printing device to perform printing based on image data, the image processing device comprising:
a data acquisition unit configured to acquire the image data; and
an image processing unit configured to generate ink amount data, based on the acquired image data, and to generate the print data, based on the generated ink amount data, wherein
the image processing unit determines the ink amount data based on a brightness L calculated using a function f3(D) satisfying f1(D)≥f3(D) in a range of gradation values D from coordinates Pk to coordinates Ps and also satisfying f1(D)>f3(D) in at least part of the range, and/or a function f4(D) satisfying f2(D)≤f4(D) in a range of the gradation values D from the coordinates Ps to coordinates Pw, and also satisfying f2(D)<f4(D) in at least part of the range
when, in a color gamut of a color space of the image data, a gradation value of the image data from a black point to a white point via a specific point of a predetermined hue is the gradation value D,
in a color gamut of a color space reproduced by the printing device, a brightness corresponding to the gradation value D is the brightness L,
a two-dimensional space formed by the gradation value D and the brightness L is a space (D,L),
coordinates, in the space (D,L), corresponding to the black point are the coordinates Pk,
coordinates, in the space (D,L), corresponding to the specific point are the coordinates Ps,
coordinates, in the space (D,L), corresponding to the white point are the coordinates Pw,
a straight line, in the space (D,L), including the coordinates Pk and the coordinates Ps is L=f1(D), and
a straight line, in the space (D,L), including the coordinates Ps and the coordinates Pw is L=f2(D).

9. A printing system comprising:
the image processing device according to claim 8; and
a printing device configured to perform printing based on print data generated by the image processing device.

* * * * *